United States Patent [19]
Hauser et al.

[11] Patent Number: 5,139,806
[45] Date of Patent: Aug. 18, 1992

[54] PROCESS FOR EXTRUDING PASTAS

[75] Inventors: Thomas W. Hauser; Jürg Lechthaler, both of Zurich, Switzerland

[73] Assignee: Nestec S.A., Vevey, Switzerland

[21] Appl. No.: 738,177

[22] Filed: Jul. 30, 1991

[30] Foreign Application Priority Data

Aug. 16, 1990 [EP] European Pat. Off. ........ 90115633.1

[51] Int. Cl.⁵ .................. A23L 1/00; A23P 1/00
[52] U.S. Cl. ..................... 426/496; 425/204; 425/208; 425/209; 426/504; 426/519; 426/557
[58] Field of Search ............ 426/496, 504, 516, 517, 426/519, 557, 486; 425/204, 208, 209

[56] References Cited

U.S. PATENT DOCUMENTS

| | | | |
|---|---|---|---|
| 4,185,123 | 1/1980 | Wenger et al. | 426/516 |
| 4,474,473 | 10/1984 | Higuchi et al. | 425/208 |
| 4,943,402 | 7/1990 | Kafka et al. | 425/204 |

FOREIGN PATENT DOCUMENTS

| | | | |
|---|---|---|---|
| 61-268145 | 11/1986 | Japan | 426/504 |
| WO9005452 | 5/1990 | PCT Int'l Appl. | |

Primary Examiner—George Yeung
Attorney, Agent, or Firm—Vogt & O'Donnell

[57] ABSTRACT

A pasta is prepared by mixing particulate cereal semolina, which has a particle size of less than 300 μm, with water in amounts so that the semolina-water mixture has a water content of from 30% to 35% by weight, and then the moistened semolina is kneaded and then extruded. The mixing, kneading and extrusion is carried out in an extrusion unit which has two identical parallel screws which rotate in the same direction. The temperature of the product which is mixed, kneaded and extruded is maintained below 55° C.

10 Claims, 1 Drawing Sheet

PROCESS FOR EXTRUDING PASTAS

BACKGROUND OF THE INVENTION

This invention relates to a process for the production of pastas by extrusion and to an extrusion unit for carrying out this process.

A conventional process for the production of pastas comprises thoroughly mixing a cereal flour and a suitable quantity of water in a first unit to obtain a pasta in which hydration of the starch and gluten has already started.

In a second stage and in a second unit, the paste obtained is subjected to a mechanical kneading treatment during which the gluten network leading to an elastic product is established.

In a third stage and in a third unit, the paste obtained is subjected either to extrusion in a unit consisting of a screw extruder accommodated in a casing terminating in a dye, which gives the product its final shape, or to rolling.

The first stage can last 20 to 30 minutes, the second stage lasting approximately 10 minutes.

Various attempts have been made to shorten the duration of the process.

Thus, it has been proposed to carry out the first stage in a high-speed mixer. This reduces the duration of this stage to less than 30 seconds.

In addition it has been proposed, Cf. for example PCT Patent Application Publication NO. WO 90/05452, to carry out the first two stages in a single unit consisting of two interengaging endless screws rotating in the same direction and accommodated in a casing.

In this document, it is thus proposed to make a paste, for example intended to be subsequently extruded by a screw extruder to give pastas, the mixing and kneading phases being carried out in a single unit over period of less than 1 minute.

In this process, the water content of the paste after the addition of water is between 25% and 40% by weight and the product is kept at a temperature of 40° to 50° C. to avoid cooking which would produce irreversible changes in the product.

Although this apparatus and this process effectively enable the mixing and kneading time to be substantially reduced, it nevertheless remains that the paste obtained still has to be transferred to a separate extrusion unit.

Thus, on the one hand, the production process is not continuous and, on the other hand, the reduction in the production time is not optimal.

SUMMARY OF THE INVENTION

Accordingly, the problem addressed by the present invention was to enable pastas to be continuously produced in a single extrusion unit while, at the same time, reducing the total duration of the process comprising the phases of mixing, kneading and extrusion to less than 1 minute.

It has been found that, under certain conditions of use, it was possible to solve this problem with an extrusion unit comprising two parallel interengaging screws.

Accordingly, the present invention relates to a process for the production by extrusion of pastas having a water content after extrusion of at least 28% by weight, in which a cereal semolina having a particle size below 300 μm is mixed with water to a water content of 30% to 35% by weight, after which the gluten network is established by kneading before extrusion of the product obtained, the mixing, kneading and extrusion phases being carried out in a single unit consisting of two identical and parallel endless screws rotating in the same direction as, and interengaging in, one another and accommodated in a casing, the temperature of the product remaining below 55° C. throughout the duration of the process.

By virtue of the initial moisture content and the exit moisture content, the paste obtained after kneading can be effectively extruded in a twin-screw extruder without any excessive increase in temperature.

In addition, by using a semolina having a particle size below 300 μm, it is possible to obtain rapid and, above all, homogeneous humidification which it would it would not be possible to obtain if the semolina were to have a wide particle size distribution.

The present invention also relates to an extrusion unit for carrying out the process described above, comprising two identical and parallel, interengaging endless screws accommodated in a casing equipped at one of its ends with an extrusion die and, at its other end, with a supply for semolina and with a water supply, the two screws comprising kneading and mixing zones and also a terminal zone situated at the end of the casing adjoining the extrusion die for placing the product under pressure and extruding the product, a source for placing the casing under a partial vacuum being provided upstream of the terminal zone.

Other features and advantages of the invention will become apparent from the following description in conjunction with the accompanying drawing which is provided purely by way of example and is a diagrammatic vertical section through the apparatus according to the invention.

DETAILED DESCRIPTION OF THE INVENTION

In the process according to the invention, a cereal semolina is brought rapidly to a water content of 30 to 35% by weight.

To allow rapid and homogeneous humidification of the semolina, its particle size distribution should be as narrow as possible. To this end, the semolina preferably has a particle size below 300 μm.

The paste obtained is then kneaded to establish the gluten network.

Finally, the product is extruded under pressure to obtain pastas having a water content at least equal to 28% by weight.

To avoid cooking of the paste, which would result in changes to the structure of the starches and the gluten, the entire process takes place at a temperature below 55° C.

In addition, to allow continuous production in a single unit, the homogenization, kneading and extrusion phases are carried out in a single unit consisting of two identical and parallel endless screws rotating in the same direction as, and interengaging in, one another and accommodated in a casing.

To ensure that this continuous treatment can be effectively carried out without any increase in temperature and, in addition, with industrially acceptable throughputs, it is necessary to have a sufficiently low viscosity to avoid heating by friction.

Now, all things otherwise being equal, the lower the temperature, the higher the viscosity and the greater the increase in pressure.

To be able work at sufficiently low temperatures to avoid cooking of the product while, at the same time, having an acceptable viscosity to avoid blockage of the installation and, in addition, to allow adequate production rates, it has been found that an initial water content of 30% to 35% by weight is necessary to obtain a product still having a water content of at least 28% by weight after extrusion.

In effect, a degassing phase in which a partial vacuum is applied is best introduced between the kneading-homogenization phase and the extrusion phase to eliminate the gases included in the product after kneading which is accompanied by a certain loss of water.

In addition, it has been found that the two screws should preferably rotate at a speed of 80 to 120 revolutions per minute.

It is thus possible in less than 1 minutes to homogenize the semolina and the water, to knead the mixture and, finally, to extrude the kneaded mixture to obtain a product which need only be dried by a known method.

BRIEF DESCRIPTION OF THE DRAWING

The drawing FIGURE illustrates a partial view of an extrusion unit for carrying out the process of the present invention.

DETAILED DESCRIPTION OF THE DRAWING

Figure 1:
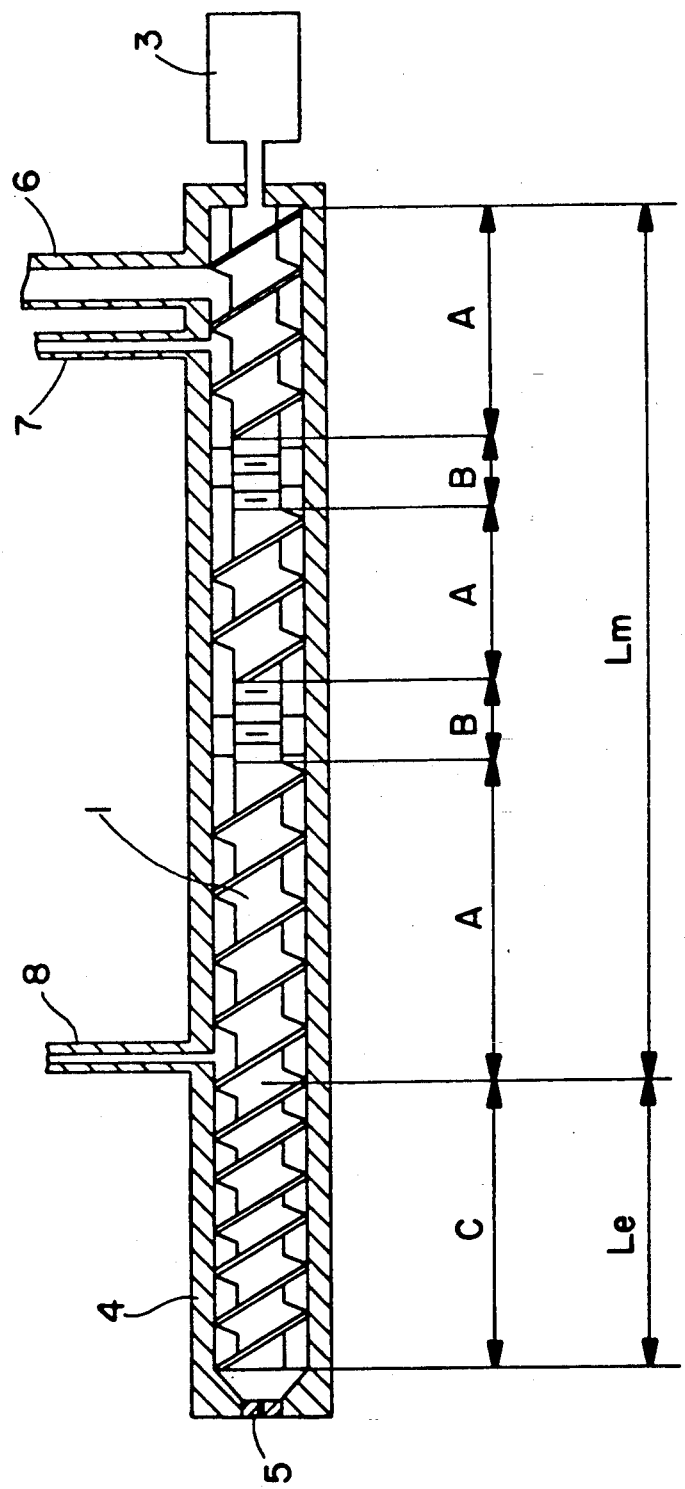

Referring to the accompanying drawing, in the interests of clarity, only one screw is shown in the drawing FIGURE but an extrusion unit according to the invention comprises two identical and parallel, co-rotating extrusion screws 1 which are designed to rotate about their longitudinal axes and which are driven by a motor 3, the power transmitted by the screws representing approximately 25% of the power of the motor 3.

The extrusion screws are mounted in a casing 4 which, at one end opposite the motor 3, has a cross-section which tapers and terminates in an extrusion die 5. Two feeders 6 and 7 are provided at that end of the casing 4 opposite the end which terminates in the extrusion die 5.

Means for regulating the temperature of the casing 4, for example in the form of a water circuit, may be provided.

The feeder 6, which is further away from the extrusion die 5, is used to supply the semolina while the feeder 7 close to the feeder 6 is used to supply water.

Means for regulating the semolina and water supplies are of course provided, but have not been shown.

In addition, the drawing shows that the screws 1 alternately comprise zones A, in which the water and semolina are thoroughly mixed, and zones B in which the actual kneading takes place.

Provided downstream of the mixing and kneading section formed by the zones A and B is a zone C in which the kneaded semolina is placed under pressure for extrusion and in which the pressure can reach several tens of bars and may even exceed 100 bars.

This zone C is the actual extrusion zone for the product.

Provided upstream of the zone C, preferably at the boundary between the mixing and kneading section and the zone C, is a vacuum source 8 which enables any increase in pressure in the zones A and B to be avoided and which, by allowing degassing of the paste, also enables a more compact end product of better quality and better external appearance to be obtained.

In addition, the length Le of the extrusion zone C, in which the kneaded semolina is passed for being placed under pressure for extrusion and the length Lm of the section formed by the zones A and B, in which the semolina is passed for mixing with water and kneading, are in a ratio Le:Lm of between 0.05 and 0.1.

Finally, if D is the diameter of the screws 1 and L is the total length of the zones A, B and C of the screws 1, which represent the active length of those screws, the ratio L:D is between 25 and 30.

EXAMPLE 28.7% water was added to a semolina of durum wheat having a water content of 14% by weight, thus producing a paste having a water content of 33.16% by weight.

The mixture was treated by the process according to the invention in an apparatus according to the invention at an extrusion temperature of 51.9° C., the screws rotating at 120 revolutions per minutes.

Pastas comparable in quality to pastas produced in accordance with the prior art were thus obtained in less than 1 minute.

We claim:

1. A process for preparing a pasta comprising rotating two identical parallel interengaging screws contained in a casing in a same direction, feeding water and a particulate cereal semolina having a particle size less than 300 μm to the screws, wherein the water is fed in an amount sufficient to moisten the semolina to a moisture content of from 30% to 35% by weight, mixing the water and semolina with the rotating screws, kneading moistened semolina with the rotating screws and extruding the kneaded semolina from the rotating screws so that the temperature of the semolina product mixed, kneaded and extruded is below 55° C.

2. A process according to claim 1, further comprising degassing the kneaded semolina prior to extruding it.

3. A process according to claim 2, wherein the kneaded semolina is degassed by applying a partial vacuum to the kneaded semolina.

4. A process according to claim 1 wherein the screws are rotated at a speed of from 80 to 120 revolutions per minute.

5. A process according to claim 1 wherein the screws have a length to diameter ratio of between 25 and 30.

6. A process according to claim 1 wherein the screws comprise a zone for mixing the semolina and water, a zone for kneading the moistened semolina and a zone for placing the kneaded semolina under pressure for extrusion and wherein a distance the kneaded semolina is passed for being placed under pressure for extrusion with respect to a distance the semolina is passed for mixing with water and kneading is in a ratio of between 0.05 and 0.1.

7. A process according to claim 6 wherein the screws have a length to diameter ratio of between 25 and 30.

8. A process according to claim 1 wherein the screws comprise a zone for mixing the semolina and water, a zone for kneading the moistened semolina and a zone for placing the kneaded semolina under pressure for extrusion and further comprising degassing the kneaded semolina at a boundary between the zone for placing the kneaded semolina under pressure and the mixing and kneading zones.

9. A process according to claim 8 wherein the moistened semolina is degassed by means of a vacuum source.

10. A process according to claim 8 wherein a distance the kneaded semolina is passed for placing the kneaded semolina under pressure for extrusion with respect to a distance the semolina is passed for mixing the water and kneading is in a ratio of between 0.05 and 0.1.

* * * * *

UNITED STATES PATENT AND TRADEMARK OFFICE
CERTIFICATE OF CORRECTION

PATENT NO. : 5,139,806
DATED : August 18, 1992
INVENTOR(S) : Thomas W. HAUSER, et al.

It is certified that error appears in the above-identified patent and that said Letters Patent is hereby corrected as shown below:

Column 4, line 66 [line 4 of claim 10], the second occurrence of "the" should read --with--.

Signed and Sealed this

Seventh Day of September, 1993

Attest:

BRUCE LEHMAN

Attesting Officer

Commissioner of Patents and Trademarks